United States Patent [19]

Dykstra et al.

[11] Patent Number: 5,524,588
[45] Date of Patent: Jun. 11, 1996

[54] ELECTRONIC SPEED GOVERNOR

[75] Inventors: Richard A. Dykstra, Cedar Grove; Robert K. Mitchell, Brookfield, both of Wis.

[73] Assignee: Briggs & Stratton Corporation, Wauwatosa, Wis.

[21] Appl. No.: 228,288

[22] Filed: Apr. 15, 1994

[51] Int. Cl.⁶ .................................................. F02D 31/00
[52] U.S. Cl. ........................................ 123/353; 180/179
[58] Field of Search ............................. 123/350–353, 123/399, 361; 180/179, 176

[56] References Cited

U.S. PATENT DOCUMENTS

| | | | |
|---|---|---|---|
| 3,651,793 | 3/1972 | Roth et al. | 123/335 |
| 3,722,614 | 3/1973 | Sakakibara et al. | 123/353 X |
| 3,738,340 | 6/1973 | Olson | 123/335 |
| 3,884,203 | 5/1975 | Cliffgard | 123/335 |
| 3,914,619 | 10/1975 | Talmage et al. | 123/352 |
| 4,034,725 | 7/1977 | Ito et al. | 123/356 |
| 4,105,935 | 8/1978 | Arai et al. | 318/314 |
| 4,252,095 | 2/1981 | Janulmes | 123/329 |
| 4,286,685 | 9/1981 | Rudolph et al. | 123/353 |
| 4,385,601 | 5/1983 | Orova et al. | 123/335 |
| 4,403,970 | 9/1983 | Detzka et al. | 123/335 X |
| 4,462,356 | 7/1984 | Hirt | 123/335 |
| 4,475,503 | 10/1984 | Nakamura et al. | 123/361 X |
| 4,640,246 | 2/1987 | Sturdy | 123/350 |
| 4,875,448 | 10/1989 | Dykstra | 123/352 |
| 4,884,541 | 12/1989 | Marriott | 123/361 |
| 4,885,692 | 12/1989 | Kurihara et al. | 123/352 X |
| 4,936,274 | 6/1990 | Kozlov et al. | 123/352 X |
| 4,977,877 | 12/1990 | Dykstra | 123/335 |
| 5,038,879 | 8/1991 | Naito et al. | 123/352 |
| 5,085,286 | 2/1992 | Danzaki et al. | 123/352 X |
| 5,105,331 | 4/1992 | Dykstra et al. | 123/339 X |
| 5,208,519 | 5/1993 | Dykstra et al. | 318/139 |
| 5,353,762 | 10/1994 | Dykstra et al. | 123/352 |

FOREIGN PATENT DOCUMENTS

| | | | |
|---|---|---|---|
| 5994 | 12/1979 | European Pat. Off. | |
| 178058 | 4/1986 | European Pat. Off. | |
| 1563857 | 10/1977 | Germany | |
| 3103928 | 9/1982 | Germany | |
| 2751213 | 5/1990 | Germany | |
| 57-73842 | 5/1982 | Japan | 123/353 |

*Primary Examiner*—Tony M. Argenbright
*Attorney, Agent, or Firm*—Michael, Best & Friedrich

[57] ABSTRACT

The low cost speed governor for internal combustion engines may be completely powered by the ignition coil. The governor receives a periodic signal from the primary ignition winding that is indicative of the actual speed of the engine. A pulsed speed signal is generated that is functionally related to the periodic signal. The pulsed speed signal has a pulse width that is functionally related to the actual engine speed. A pulsed reference signal is generated by a timer circuit, and has a pulse width that is functionally related to a predetermined reference speed. The pulsed speed signal is then compared with the pulse reference signal by a comparator circuit, and a pulsed error signal is generated that has a pulse width which is functionally related to the difference between the speed signal pulse width and the reference signal pulse width. The speed of the device is then changed by a transistor bridge network as a function of the error signal. The speed is changed using a reversible DC motor connected to the engine throttle through a gear reduction system. The electronic governor may also include a delay circuit which delays the operation of the governor when an underspeed condition occurs during engine warm-up. Another optional circuit in the governor limits the changing of the engine speed when only a slight underspeed condition exists, to prevent unnecessary cycling of the engine speed.

20 Claims, 4 Drawing Sheets

ELECTRONIC SPEED GOVERNOR

BACKGROUND OF THE INVENTION

The invention relates to speed governors for power producing and absorbing devices, such as internal combustion engines. More particularly, this invention relates to electronic speed governors for small engines like those used on lawnmowers, snowblowers, generators and the like.

Automatic devices that cause power producing and absorbing machines to operate near a fixed speed are well known in the art. Such automatic devices are commonly referred to as "speed governors". Typically, such speed governors are either of the mechanical type or of the electronic type.

Various types of mechanical governors are well known in the art. However, such governors are often bulky, contain numerous moving parts, and are expensive.

Many types of electronic speed governors are also well known in the art. Such electronic devices permit more accurate control of engine speed, but often contain many semiconductor components that thereby increase the cost of the governor. In addition, typical prior art electronic governors require a separate DC power source such as a battery to power the governor's electronic components. This also further increases the cost and complexity of the typical prior art governor.

SUMMARY OF THE INVENTION

A speed governor for controlling the actual speed of a device comprises an input means for receiving a periodic signal that is indicative of the actual speed of the device, and a first means for generating a pulsed speed signal that is functionally related to the periodic signal such that the pulse width of the pulsed speed signal is also functionally related to the actual engine speed. The periodic signal may be an AC signal generated by a winding on the device's ignition coil frame, from a separate coil assembly, or from a battery-powered or alternator-powered sensor. The speed governor also includes a second means for generating a pulsed reference signal whose pulse width is functionally related to a desired device speed. The pulsed speed signal is then compared with the pulsed reference signal by a comparison means. The comparison means generates a pulsed error signal whose pulse width is functionally related to the difference between the speed signal pulse width and the reference signal pulse width. In one embodiment, a determining means then determines whether the actual speed of the device is above or below the desired speed, and generates a control signal that is indicative of the result of that determination and that is also functionally related to the error signal pulse width. In response to the control signal, a changing means changes the speed of the device such that the magnitude of the speed change is a function of the magnitude of the difference between the actual speed and the desired speed.

In a preferred embodiment, the speed governor also includes a means for preventing the changing of the device speed when the width of the error signal pulse is less than a predetermined value. This feature avoids the unnecessary cycling of the device when the engine speed is near the desired reference speed, thereby allowing the device speed to vary within a predetermined speed band, without correcting the speed of the device.

The preferred embodiment also includes a means for controlling the increase of the device speed in response to the governor during warm-up of the device.

It is a feature and advantage of the present invention to provide a low cost electronic governor that uses a small coil or the ignition primary winding to power all of the governor's components.

It is another feature and advantage of the present invention to provide an electronic governor having a minimum number of integrated circuits and other semiconductor components.

It is another feature and advantage of the present invention to provide a low cost electronic governor having proportional speed control.

These and other features of the present invention will be apparent to those skilled in the art from the following detailed description of the preferred embodiments and the drawings, in which:

BRIEF DESCRIPTION OF THE DRAWINGS

FIG. 3(a) depicts the periodic input signal. FIG. 3(b) depicts the output signal of the optional signal conditioner circuit. FIG. 3(c) depicts the pulsed speed signal for an underspeed condition. FIG. 3(d) depicts the pulsed referenced signal. FIG. 3(e) depicts the pulsed error signal which corresponds to the difference in the pulse width between the pulsed speed signal and the pulsed reference signal. FIG. 3(f) depicts the current flowing through the motor as a function of the error signal.

DETAILED DESCRIPTION OF THE PREFERRED EMBODIMENTS

The following descriptions and the drawings assume that the governor is being used to control the throttle position of an internal combustion engine. However, the governor according to the present invention may be used to control the position of other actuators in power-producing and power-absorbing devices, such as electric motors and dynamometers, to thereby control the actual speed of such devices.

Figure 1:
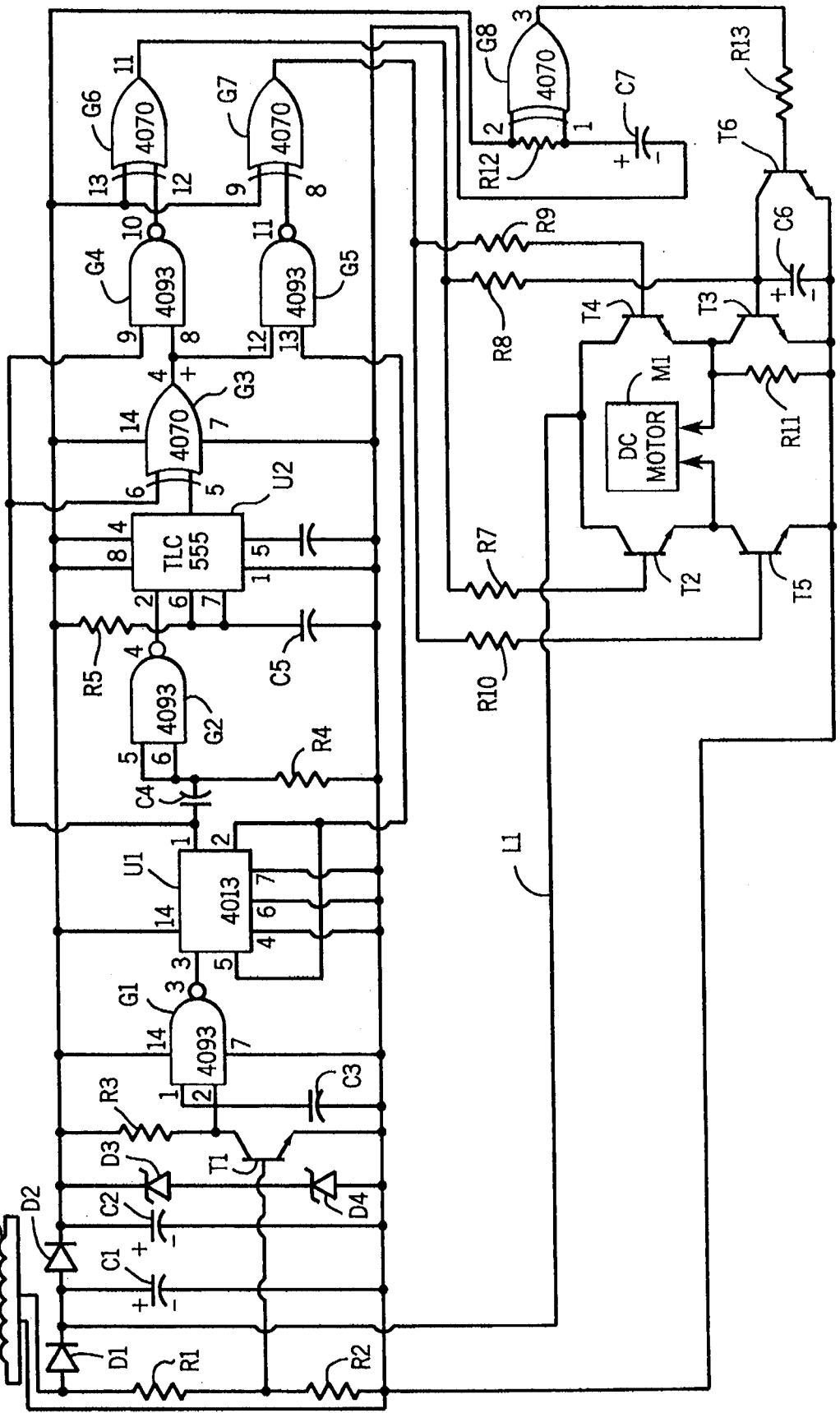
FIG. 1 is a schematic diagram of a first embodiment of the present invention.
Figure 3:
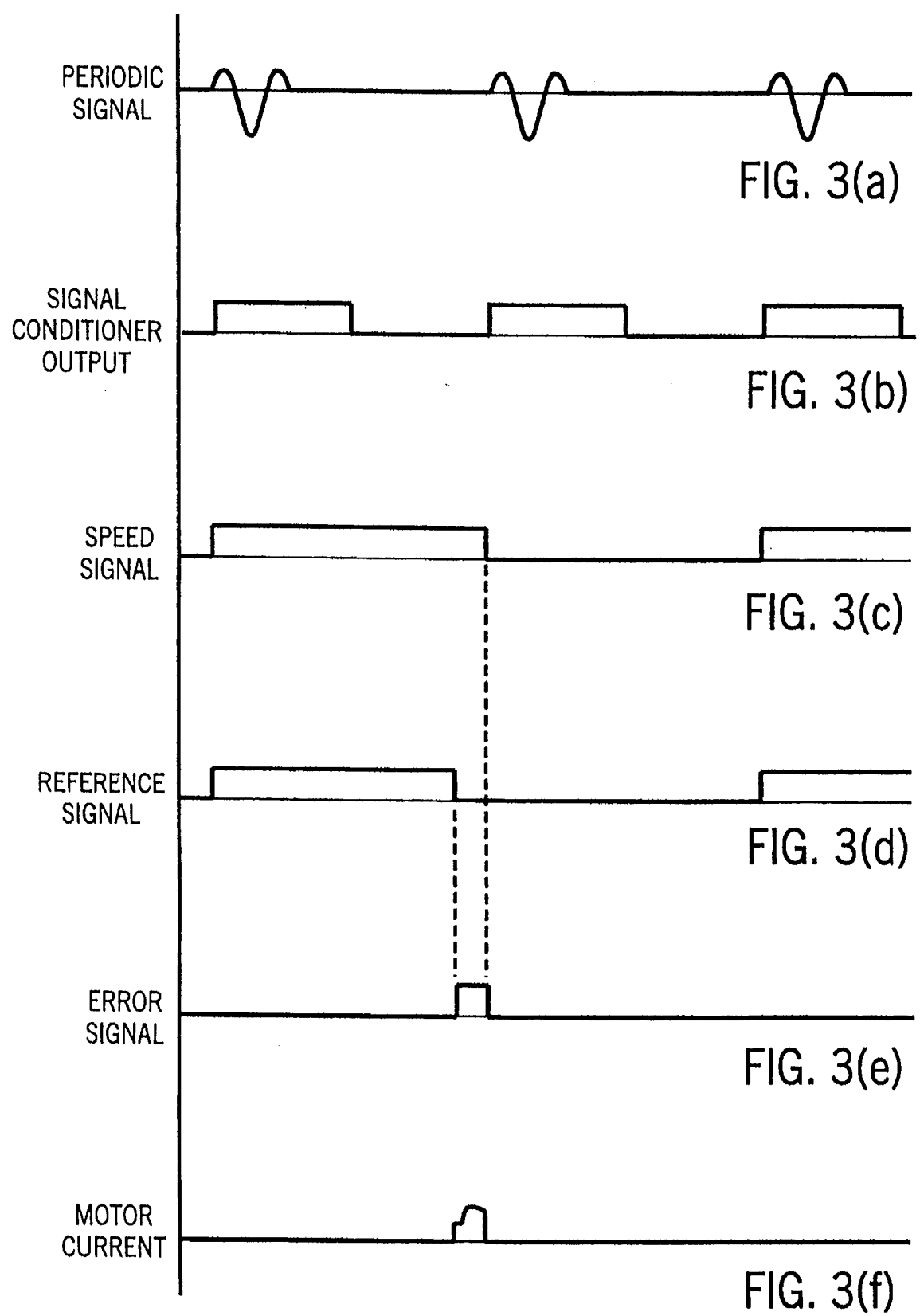
FIGS. 3(a) through 3(f) are timing diagrams relating to the circuits of FIGS. 1 and 2 when the device is in an underspeed condition.

Referring to FIG. 1, a rotating flywheel FW generates an alternating periodic signal in winding W1. FIG. 3(a) depicts this periodic signal. Winding W1 is preferably the ignition primary winding of a gasoline-powered, internal combustion engine, although winding W1 could be a small power winding attached to one leg of the engine's ignition coil frame. This arrangement significantly reduces the governor's cost since no battery, with its accompanying charging system, is required.

However, the present invention may also be used with a battery. In that event, the battery would be used for system power, and the input periodic signal may be derived from winding W1 or from a battery-powered sensor such as a Hall-effect sensor (not shown). Even if a battery is available, however, it may be desirable to use winding W1 to power the electronic governor since the governor may then be used regardless of the state of the battery charge.

The power supply for the electronic governor depicted in FIG. 1 includes diodes D1 and D2, capacitors C1 and C2, and zener diodes D3 and D4. In some applications, it may be desirable to combine zener diodes D3 and D4 into a single diode.

When the governor is used on a small engine, the power supply generates a supply voltage each time a magnet MA affixed to flywheel FW passes ignition winding W1. Diode rectifiers D1 and D2 convert the input supply voltage from AC to DC. Capacitors C1 and C2 provide energy storage to maintain a more constant power supply voltage as a function of time. Zener diodes D3 and D4 limit the power supply voltage to a value that is acceptable for the sensing and control circuitry, described below. The voltage across capacitor C1 is used to power the governor's output motor drive circuit, while the voltage across capacitor C2 is used to power the governor's sensing and control circuitry.

The governor depicted in FIG. 1 includes an optional signal conditioning circuit that receives a periodic signal from the power supply and that outputs a pulsed DC signal to the governor's sensing and control circuitry. The signal conditioning circuit includes NPN transistor T1, a voltage divider consisting of resistors R1 and R2 that control the base-to-emitter junction of transistor T1, a resistor R3, a NAND gate inverter G1, and a capacitor C3.

The signal conditioning circuit operates in the following manner. When a periodic signal is generated by winding W1, NPN transistor T1 is biased ON through the voltage divider consisting of resistors R1 and R2. The biasing ON of transistor T1 causes capacitor C3 to discharge through transistor T1, thereby causing NAND gate G1 to change rapidly to a high-state output. When transistor T1 no longer conducts, capacitor C3 begins to charge through resistor R3. As long as the voltage across capacitor C3 is below the input threshold voltage of gate G1, the inputs to gate G1 remain at a low-state and the output of gate G1 remains at a high-state. As soon as the voltage of capacitor C3 exceeds the input threshold voltage for gate G1, the output of gate G1 returns to a low-state. Thus, the signal conditioning circuit has a timing function that is used to provide a rectangular-wave input signal to the governor's sensing and control circuitry. The timing function of the signal conditioning circuit should be longer than the time duration of the periodic signal generated by coil W1 at normal engine operating speeds. The output of the signal conditioning circuit is depicted in FIG. 3(b).

A divide-by-two circuit U1 is used to receive the periodic signal generated by a DC-powered sensor (not shown) if no signal conditioner is used, or to receive the pulsed signal generated by NAND gate G1 if a signal conditioner is used. The purpose of device U1 is to receive the periodic signal and to output a pulsed speed signal whose pulse width is a function of the actual engine speed. The pulsed speed signal for an underspeed condition is depicted in FIG. 3(c). By comparing FIGS. 3(a) and 3(c), it is apparent that the pulse width of the speed signal is equal to the time duration between the onset of successive periodic signals. The speed signal changes state at the onset of each periodic signal, so that the pulse width of both the high-states and the low-states of the speed signal are a function of the actual speed of the device. The speed of the device is readily determined from the time between the onset of successive periodic signals, since one periodic signal is generated for each revolution of the engine flywheel.

Figure 4:
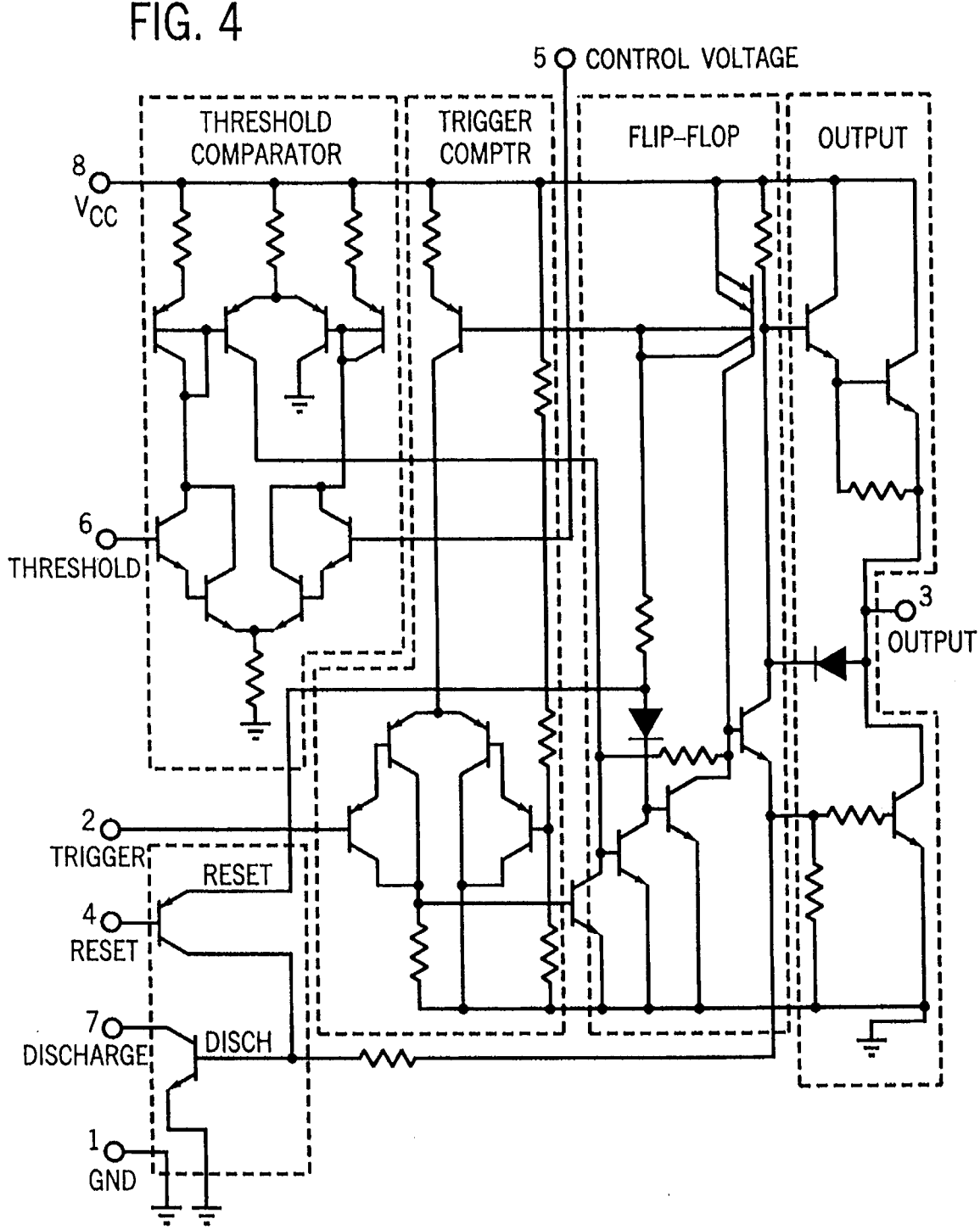
FIG. 4 is a schematic diagram of an integrated 555 timer which may be used in the first embodiment of the present invention.

Referring again to FIG. 1, the output of device U1 is conditioned by a differentiator circuit consisting of capacitor C4 and resistor R4. This conditioned signal is input to both inputs of a second NAND gate G2, that is used to initiate a timing cycle of an integrated circuit timer U2. The integrated circuit timer is preferably a 555 timer, although other monostable multivibrators may be used. One suitable 555 timer is sold by Motorola under part no. MC1455. A circuit diagram of a typical timer U2 is depicted in FIG. 4.

Timer U2 initiates a timing cycle each time the output of divide-by-two circuit U1 changes from a low-state to a high-state. The pulse width of the timer U2 output signal corresponds to the time period of one engine flywheel revolution at the desired or reference engine speed. The pulse width of this reference signal is preset by the timing circuit consisting of resistor R5 and capacitor C5, which are connected to an input of timer U2. The pulsed reference signal is depicted in FIG. 3(d). Resistor R5 may be replaced by a variable-resistance potentiometer to provide variable speed control.

The output of timer U2 is then compared with the output of divide-by-two circuit U1 by an Exclusive-OR Gate G3. As depicted in FIG. 1, pin 6 of gate G3 is connected to the pin 1 output of circuit U1. Pin 5 of gate G3 is connected to output pin 3 of timer U2.

The purpose of the comparison by gate G3 is to determine whether the actual engine speed, as indicated by the output of device U1, is equal to the reference speed, as indicated by the output of timer U2. If these two inputs to gate G3 are substantially equal, the output of gate G3 remains at a low-state. When the actual engine speed differs from the reference speed, the output signal generated by gate G3 goes to a high-state, with the pulse width of this error signal being proportional to the difference between the actual engine speed and the desired speed. The error signal for an underspeed condition is depicted in FIG. 3(e).

A determination is then made as to whether the actual engine speed is above or below the desired engine speed. This determination is made by a circuit consisting of two NAND gates G4 and G5 and two Exclusive-OR Gates G6 and G7, which are used as inverters. Input 9 of NAND gate G4 is connected to output pin 1 of divide-by-two device U1. Input pin 8 of gate G4 is connected to the output of Exclusive-OR Gate G3. Input pin 12 of NAND gate G5 is connected to the output of gate G3. Input pin 13 of gate G5 is connected to the inverted output of device U1, the inverted signal being output at pin 2 of device U1. In other words, the output of gate G3 is compared with the output of circuit U1 by gate G4 and the output of gate G3 is also compared with the inverted signal of device U1 by gate G5.

This determination circuit operates in the following manner. In an underspeed condition, both inputs to NAND gate G4 are in their high-state simultaneously, so that the output of gate G4 is at its low-state. The low-state output of gate G4 is inverted by Exclusive-OR Gate G6, so that the output of gate G6 is a high-state control signal which turns ON transistors T2 and T3 through resistors R7 and R8 respectively. Motor current then causes the drive shaft of motor M1 to rotate in a first direction, thereby partially opening the throttle.

Also in an underspeed condition, the output of gate G5 remains continuously in its high-state since the inverted output at pin 2 of device U1 and the output of gate G3 are never at a high-state simultaneously. This high-state signal output by gate G5 is inverted by gate G7, whose other input is connected to the power supply. Thus, the output of gate G7 stays low in an underspeed condition, thereby keeping transistors T4 and T5 OFF.

If an overspeed condition exists, the output of device U1 goes to its low-state before the output of timer U2 goes to its low-state. In that event, the output of gate G3 is high. The output of NAND gate G4 stays high since its inputs at pins 8 and 9 are never at a high-state simultaneously in an overspeed condition. Gate G6 inverts the high-state output of gate G4, and outputs a low-state signal. Thus, transistors T2 and T3 connected to the output of gate G6 remain OFF.

Also in the overspeed condition, the output of gate G3 and the inverted output of timer U1 are at high-states simultaneously. Gate G5 thus receives two high-state inputs, and the output of gate G5 goes low. When the output of gate G5 is low, the output of inverter G7 is high, thereby generating a control signal that turns ON transistors T4 and T5 through resistors R9 and R10 respectively. Motor current is thus generated through motor M1 in a second direction to at least partially close the throttle.

The length of time that any of the drive circuit transistors conduct is proportional to the pulse width of the control signal, that pulse width being a function of the difference between the actual and desired engine speeds. Thus, the length of time that the transistors conduct is functionally related to the pulse width of the error signal generated by gate G3.

In either the underspeed or the overspeed condition, the amount of rotation of the motor drive shaft and thus of the throttle plate is a function of the difference between the actual speed and the desired engine speed. A gear-reduction system is typically connected between the DC motor drive shaft and the engine's throttle plate to insure that throttle plate position is precisely controlled. The speed governor could also be used to control an engine fuel injection system instead of carburetor throttle plate position.

The motor drive output section consisting of transistors T2 through T5 and resistors R7 through R10 may be replaced by a single integrated circuit motor drive chip, such as that sold by Cherry Semiconductor of East Greenwich, R.I., Model No. CS-298. The speed governor can also be used with a push-pull amplifier drive circuit. With this drive circuitry, the output of one operational amplifier goes to a high-state while the output of the second operational amplifier goes to a low-state, and vice versa, causing the motor current to flow in a first or a second direction.

The circuit depicted in FIG. 1 includes two optional circuits that may be desirable in many applications. The first optional circuit creates a "speed band" in which the engine speed is allowed to vary with only limited correction of the actual speed when the actual speed is slightly less than the reference speed, by using a time delay circuit. The speed band is preferably between 20 to 200 wide rpm, with the desired engine speed being at the high end of the speed band. Of course, this time delay could also operate when the actual speed is slightly higher than the reference speed, so that the desired speed is in the middle of the speed band. The purpose of the speed band is to limit corrections in engine speed when the engine speed differs slightly from the desired speed.

Referring to FIG. 1, the speed band is achieved using capacitor C6 and resistor R8. Capacitor C6 and resistor R8 are used to reduce the throttle positioner travel when the engine speed is just slightly lower than the desired engine speed. Capacitor C6 provides a very brief time delay to the biasing of transistor T3. When the speed difference between the actual speed and the desired speed is small, the biasing signal to transistor T3 is too short to switch transistor T3 ON through the time delay circuit. In that event, current through motor M1 is provided through transistor T2 and through resistor R11, which limits motor current to a lower value than if transistor T3 was to conduct. When the difference between the actual speed and the desired speed becomes greater, transistor T3 switches ON fully, thereby providing increased current to motor M1. A similar capacitor and resistor circuit may be applied to transistor T5, if desired, to provide a similar time delay function when the actual engine speed only slightly exceeds the desired engine speed.

Another optional feature of the present invention is to delay throttle-positioner response to the underspeed condition during initial engine starting and engine warm-up. It is desirable to delay the governor's underspeed response to allow the engine to warm up without excessive speed oscillations occurring.

This optional feature is achieved by the circuit consisting of Exclusive-OR Gate G8, resistor R12, capacitor C7, transistor T6, and resistor R13. Exclusive-OR Gate G8 has two inputs: Input pin 1 is connected to the governor's power supply through the RC timing circuit consisting of resistor R12 and capacitor C7. Input pin 2 of gate G8 is directly connected to the governor's power supply. When the engine is initially started, the output of gate G8 remains at a high-state until capacitor C7 becomes charged. During this time, transistor T6 is biased ON through resistor R13. As a result, transistor T3 is prevented from conducting. Thus, during the engine warm-up period, motor current is provided through transistor T2 and resistor R11. The underspeed throttle-positioner response is thereby limited during engine warm-up, which in turn limits the engine speed oscillations during the warm-up period.

After capacitor C7 becomes sufficiently charged, both inputs to Exclusive-OR Gate G8 are at a high-state, so that the output at pin 3 of gate G8 goes to a low-state. When the output of gate G8 goes to a low-state, transistor T6 no longer conducts, thereby allowing transistors T3 and T2 to control engine speed during an underspeed condition.

Figure 2:
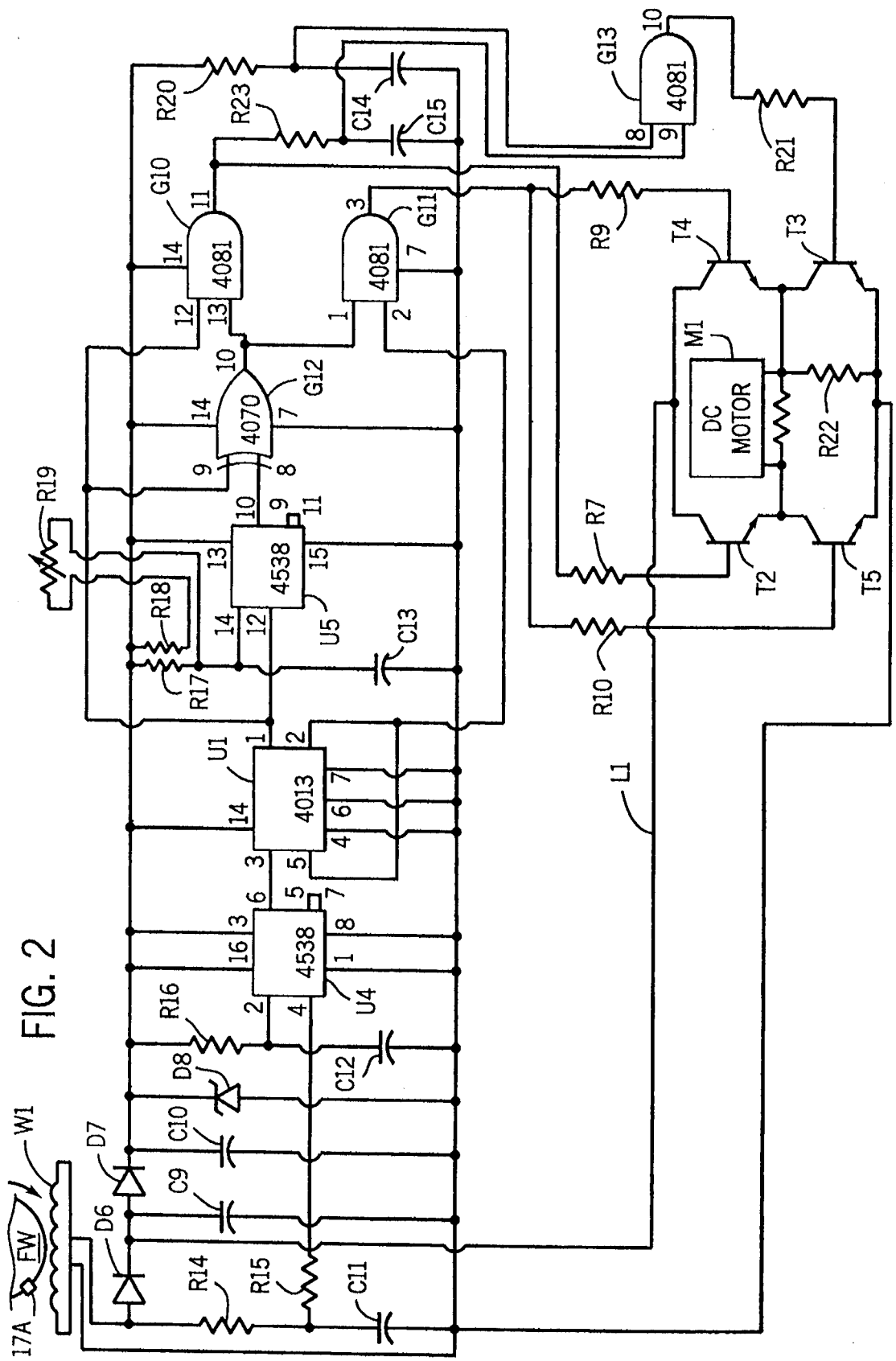
FIG. 2 is a schematic diagram of a second embodiment of the present invention.

FIG. 2 is a schematic diagram of a second embodiment of the present invention. The embodiment depicted in FIG. 2 achieves essentially the same functions as the embodiment depicted in FIG. 1, except that the FIG. 2 embodiment is lower in cost due to a reduction in the number of components.

More specifically, the embodiment depicted in FIG. 2 uses a dual-timer chip comprised of devices U4 and U5, in place of NAND gate G1 and 555 timer U2, to achieve signal conditioning and to yield the reference signal. In addition, the circuit depicted in FIG. 2 uses AND gates G10 and G11 in place of NAND gates G4 and G5 and the Exclusive-OR Gates G6 and G7 of the FIG. 1 embodiment, to determine which of the output transistors T2 through T5 will conduct.

Components in FIG. 2 which have corresponding functions to components in FIG. 1 have been given the same part designations.

In FIG. 2, the power supply consists of diodes D6 and D7, zener diode D8, and capacitors C9 and C10. The power supply functions in a manner similar to the power supply described above with respect to FIG. 1. The periodic signal from winding W1 is provided to timer U4 through resistor R14, capacitor C11, and resistor R15. Resistor R16 and capacitor C12 together form an RC timing circuit which determines the time constant of timer U4. The receipt of a periodic signal by timer U4 starts its timing cycle. The output of timer U4 at pin 6 thereof is a rectangular-wave signal whose pulse width is greater than the length of the periodic input signal from winding W1 at normal engine operating speeds. Thus, timer U4 creates a one pulse per engine revolution signal.

The output of device U4 is provided to the pin 3 input of a divide-by-two circuit U1. The function of device U1 in FIG. 2 is the same as the function of device U1 in FIG. 1. In FIG. 2, the output of divide-by-two device U1 is a rectangular-wave signal whose pulse width is functionally related to the actual engine speed.

The output of device U1 at pin 1 thereof is provided to the input of device U5, which is the other half of the dual-timer IC chip no. 4538. The timing cycle of device U5 is determined by resistor R17, capacitor C13, resistor R18, and a variable resistor R19 that may be switched into the RC timing circuit consisting of resistor R17 and capacitor C13. Variable resistor R19 allows different engine reference speeds to be set by the user. The output of timer U5 is a rectangular-wave signal whose pulse width corresponds to the desired engine speed.

The output at pin 10 of device U5 is provided to Exclusive-OR Gate G12. The function of gate G12 is substantially the same as the function of gate G3 in FIG. 1. That is, gate G12 is used to compare the pulsed speed signal output by device U1 with the pulsed reference signal output by device U5. When the pulsed speed signal is not equal to the pulsed reference signal, the output of gate G12 goes to a high-state, with the pulse width of this error signal being proportional to the difference between the actual engine speed and the desired speed.

The output of gate G12 is connected to an input of both AND gate G10 and AND gate G11. Regarding AND gate G10, its input pin 12 is connected to output pin 1 of device U1. Both inputs to gate G10 are at a high-state during an underspeed condition, so that the output of gate G10 is also at a high-state in an underspeed condition. In that event, transistors T2 and T3 are turned ON to provide motor current to motor M1 in a first direction so as to partially open the engine throttle.

Again referring to gate G10, in an overspeed condition the output of gate G10 is high while the output of divide-by-two U1 is low, so that the output of AND gate G10 is low. Since no high-state control signal is output by gate G10 in overspeed condition, transistors T2 and T3 are not turned ON.

Referring now to AND gate G11, in an underspeed condition, the output of gate G12 will be high when the inverted output of device U1 provided to pin 2 of gate G11 is at its low-state. Thus, the output of AND gate G11 is at its low-state in an underspeed condition, so that no high-state control signal is provided to transistors T4 and T5. Thus, transistors T4 and T5 do not conduct in an underspeed condition.

In an overspeed condition, the output of AND gate G11 is at its high-state since the output of gate G12 and the inverted output of device U1 are both in their high-state at the same time. In the overspeed condition, gate G11 outputs a control signal to turn ON transistors T4 and T5. Motor current is thus provided to motor M1, and the engine throttle is at least partially closed to reduce the engine speed.

As in the FIG. 1 embodiment, the embodiment of FIG. 2 also delays the response of the governor to an underspeed condition during engine warm-up. The circuit which achieves this function consists of AND gate G13, resistor R20, capacitor C14, and resistor R21. This circuit operates as follows. During engine warm-up, the input to pin 8 of gate G13 remains at its low-state until capacitor C14 becomes sufficiently charged through resistor R20. When pin 8 of gate G13 is low, the output of gate G13 remains low, so that transistor T3 does not conduct. However, some motor current is still provided to DC motor M1 through transistor T2 and resistor R22. Once capacitor C14 has become sufficiently charged, pin 8 of gate G13 goes high. When the input at pin 9 of gate G13 is also high, which occurs in an underspeed condition, the output of gate G13 is controlled by gate G10, so that the conduction of transistor T3 is controlled by gate G10 in the usual manner.

The other optional circuit in FIG. 2 operates in the following manner. When the actual speed is slightly below the desired or reference speed, the amplitude of the control signal is limited to prevent unnecessary cycling of the engine. When the actual engine speed is slightly less than the reference speed, the output at pin 11 of AND gate G10 goes high. Capacitor C15 is then charged through resistor R23, keeping pin 9 of gate G13 low until capacitor C15 is sufficiently charged. Transistor T3 is thus prevented from conducting until capacitor C15 becomes sufficiently charged, since the output of gate G13 is in its low-state and no high-state control signal is generated to transistor T3. After a short time delay, capacitor C15 becomes sufficiently charged, so that pin 9 of gate G13 goes to its high-state. Since pin 8 of gate G13 is also at its high-state after engine warm-up, the output of AND gate G13 then goes to its high-state, thereby turning ON transistor T3. Transistor T2 is also turned ON at the same time since the output of AND gate G10 is also high. Thus, current flows through motor M1 to rotate the shaft of motor M1, thereby partially opening the engine throttle.

While the preferred embodiment of the present invention has been shown and described, alternate embodiments will be apparent to those skilled in the art and are within the scope of the present invention. Therefore, the invention is to be limited only by the following claims.

We claim:

1. A speed governor for controlling the actual speed of a device, comprising:

input means for receiving a periodic signal indicative of the actual speed of the device;

first means for generating a pulsed speed signal that is functionally related to said periodic signal, said pulsed speed signal having a pulse width that is functionally related to said actual speed;

second means for generating a pulsed reference signal having a pulse width that is functionally related to a desired speed;

means for comparing said pulsed speed signal with said pulsed reference signal, and for generating a pulsed error signal having a pulse width that is functionally related to a difference between said speed signal pulse width and said reference signal pulse width;

means for changing the speed of the device as a function of said error signal; and means for limiting the changing of said device speed when the width of said error signal pulse is less than a predetermined value.

2. The speed governor of claim 1, further comprising:

signal conditioning means for receiving said periodic signal from said input means and for generating a pulsed DC signal to said first generating means.

3. The speed governor of claim 2, wherein said signal conditioning means includes a timer.

4. The speed governor of claim 1, further comprising:

means for determining whether said actual speed is above or below said desired speed, and for generating a control signal to said speed changing means that is indicative of said determination and that is functionally related to said error signal pulse width.

5. The speed governor of claim 4, wherein said determining means includes two logic gates.

6. The speed governor of claim 1, wherein said speed changing means includes a reversible DC motor.

7. The speed governor of claim 6, wherein said speed changing means includes a bridge network that determines the amount of rotation of said DC motor as a function of said error signal.

8. The speed governor of claim 6, wherein said reversible DC motor is interconnected with a throttle of an internal combustion engine.

9. The speed governor of claim 1, further comprising:
a coil that outputs said periodic signal.

10. The speed governor of claim 1, wherein said periodic signal is an alternating signal output by said device.

11. The speed governor of claim 10, wherein said device is an internal combustion engine having a primary ignition winding, and wherein said alternating signal is output by said primary ignition winding.

12. The speed governor of claim 1, wherein said periodic signal is a pulsed DC signal.

13. The speed governor of claim 1, wherein said second generating means includes:
a resistor and capacitor that determine the pulse width of said pulsed reference signal.

14. The speed governor of claim 1, wherein said first generating means includes a divide-by-two circuit.

15. The speed governor of claim 1, wherein said second generating means includes a timer.

16. The speed governor of claim 1, wherein said comparing means includes a logic gate.

17. The speed governor of claim 1, wherein said periodic signal also provides power to operate said speed governor.

18. A speed governor for controlling the actual speed of a device, comprising:

input means for receiving a periodic signal indicative of the actual speed of the device;

first means for generating a pulsed speed signal that is functionally related to said periodic signal, said pulsed speed signal having a pulse width that is functionally related to said actual speed;

second means for generating a pulsed reference signal having a pulse width that is functionally related to a desired speed;

means for comparing said pulsed speed signal with said pulsed reference signal, and for generating a pulsed error signal having a pulse width that is functionally related to a difference between said speed signal pulse width and said reference signal pulse width;

means for changing the speed of the device as a function of said error signal; and means for controlling the increase of the device speed during warm-up of the device.

19. The speed governor of claim 18, wherein said controlling means includes a time delay circuit.

20. A speed governor for controlling the actual speed of a device, comprising:

input means for receiving a periodic signal indicative of the actual speed of the device;

first means for generating a pulsed speed signal that is functionally related to said periodic signal, said pulsed speed signal having a pulse width that is functionally related to said actual speed;

second means for generating a pulsed reference signal having a pulse width that is functionally related to a desired speed;

means for comparing said pulsed speed signal with said pulsed reference signal, and for generating a pulsed error signal having a pulse width that is functionally related to a difference between said speed signal pulse width and said reference signal pulse width;

means for changing the speed of the device as a function of said error signal; and means for limiting the changing of said device speed when the width of said error signal pulse is less than a predetermined value, wherein said limiting means includes a time delay circuit and a semiconductor switch.

* * * * *